No. 897,551. PATENTED SEPT. 1, 1908.
J. LUNDGREN.
BRAIDING MACHINE.
APPLICATION FILED NOV. 4, 1903.

7 SHEETS—SHEET 2.

WITNESSES:
INVENTOR
Jacob Lundgren
BY
A. V. Trout
ATTORNEY.

No. 897,551. PATENTED SEPT. 1, 1908.
J. LUNDGREN.
BRAIDING MACHINE.
APPLICATION FILED NOV. 4, 1903.

7 SHEETS—SHEET 4.

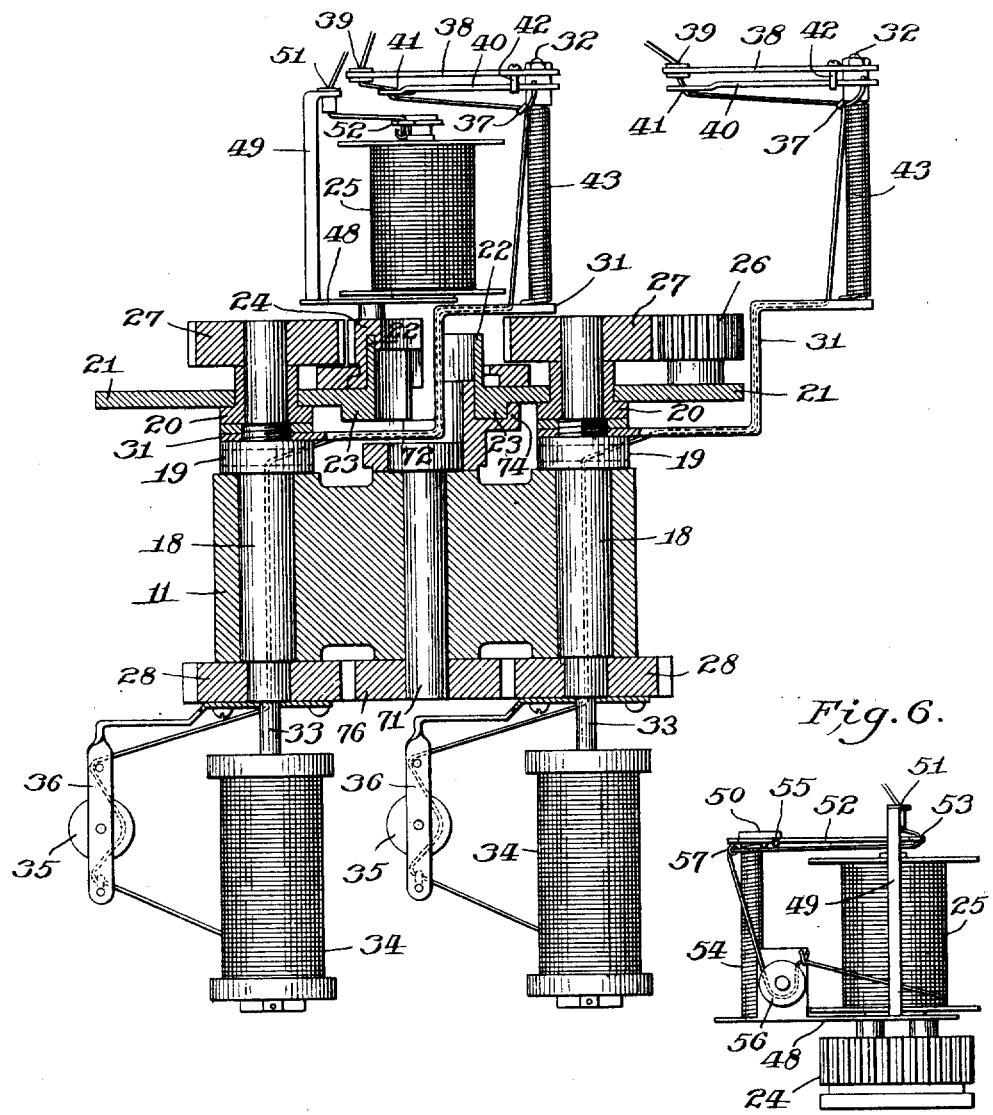

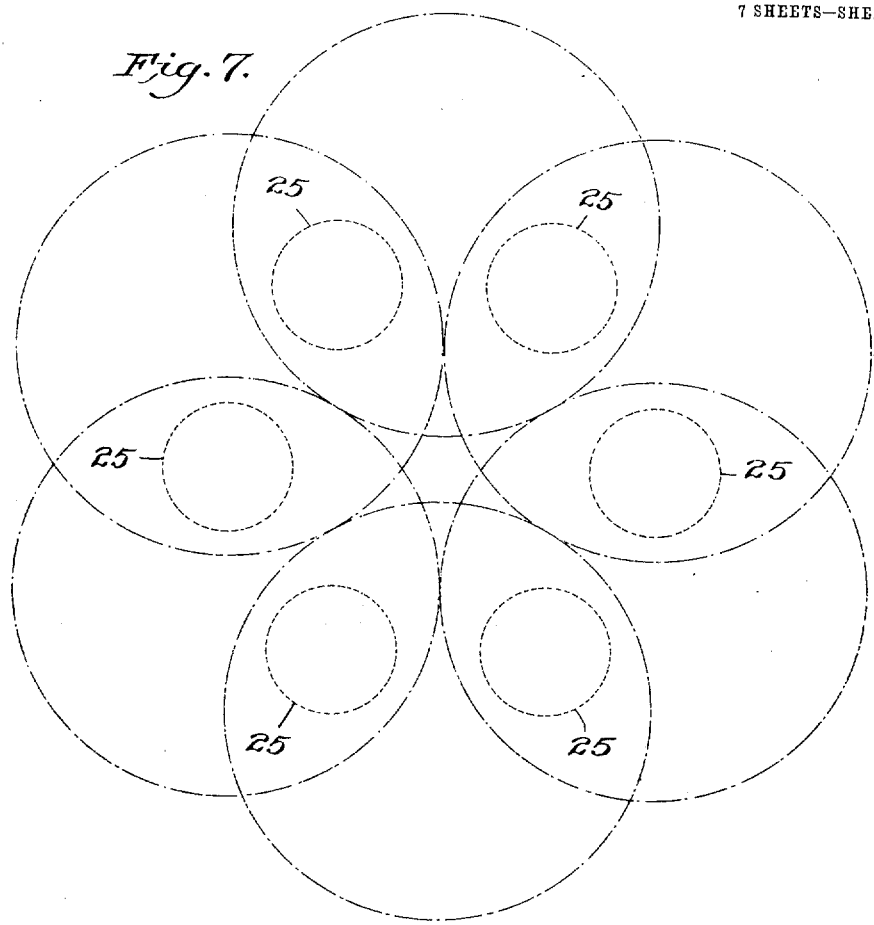
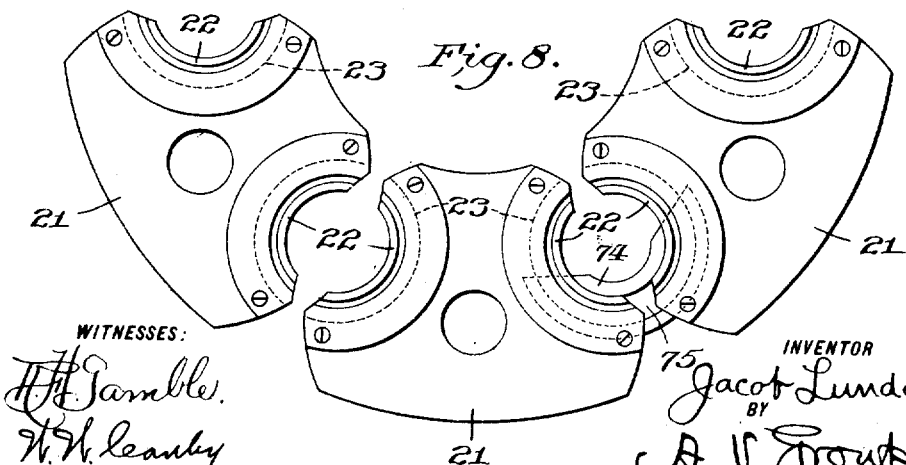

UNITED STATES PATENT OFFICE.

JACOB LUNDGREN, OF PHILADELPHIA, PENNSYLVANIA, ASSIGNOR TO SAMSON CORDAGE WORKS, OF BOSTON, MASSACHUSETTS, A CORPORATION OF MASSACHUSETTS.

BRAIDING-MACHINE.

No. 897,551.      Specification of Letters Patent.      Patented Sept. 1, 1908.

Application filed November 4, 1903. Serial No. 179,807.

*To all whom it may concern:*

Be it known that I, JACOB LUNDGREN, a citizen of the United States, residing at Philadelphia, in the county of Philadelphia and State of Pennsylvania, have invented certain new and useful Improvements in Braiding-Machines, of which the following is a specification.

This invention relates to braiding machines and has for its object to provide a simple and efficient construction and organization of mechanism whereby each thread from one set of thread-supplying devices may be passed entirely around two members of another set of thread-supplying devices with greater speed than has been heretofore attained.

The invention consists in the novel construction and combination of parts which will be hereinafter fully described and claimed.

Figure 1:
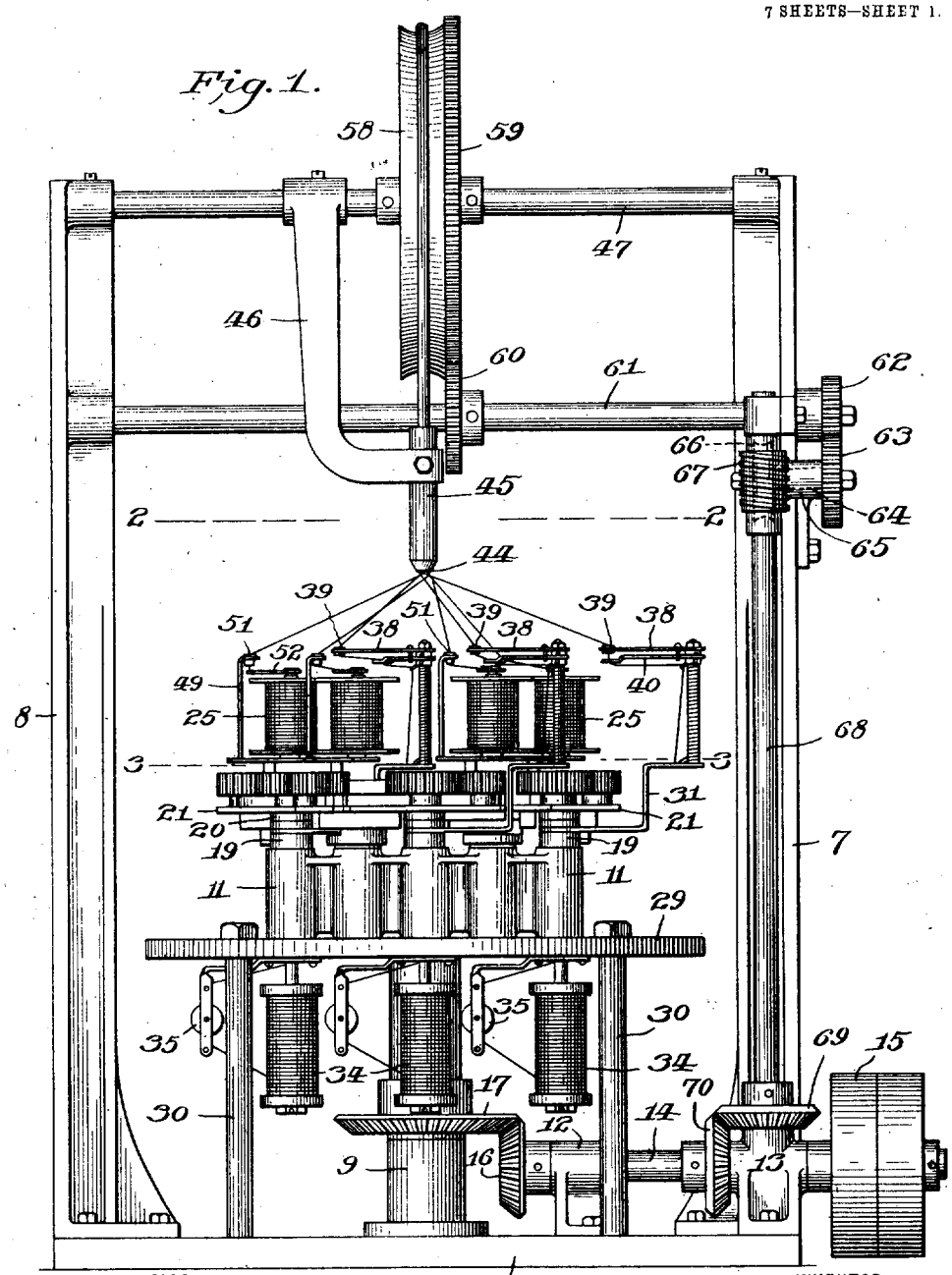
Figure 2:
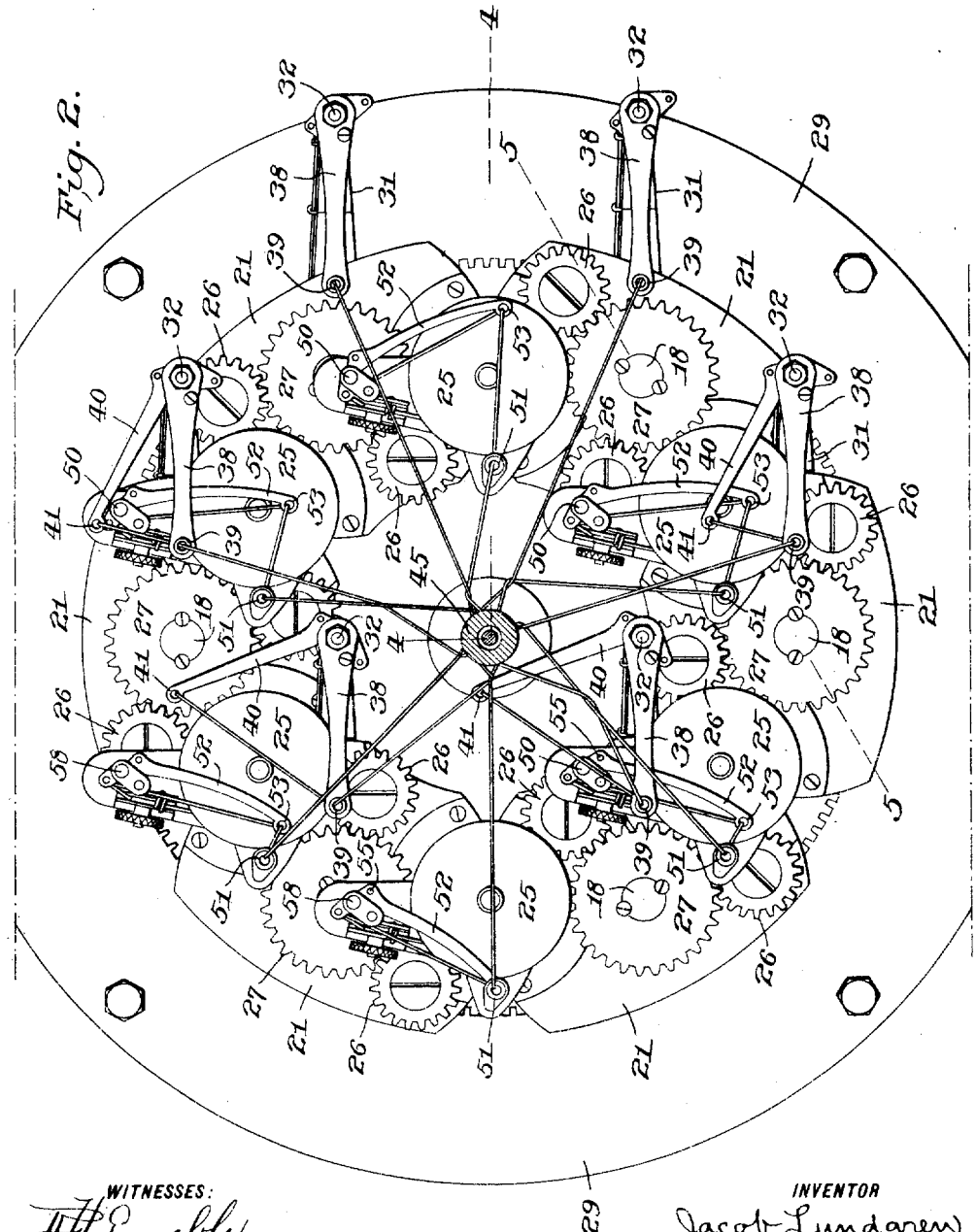
Figure 3:
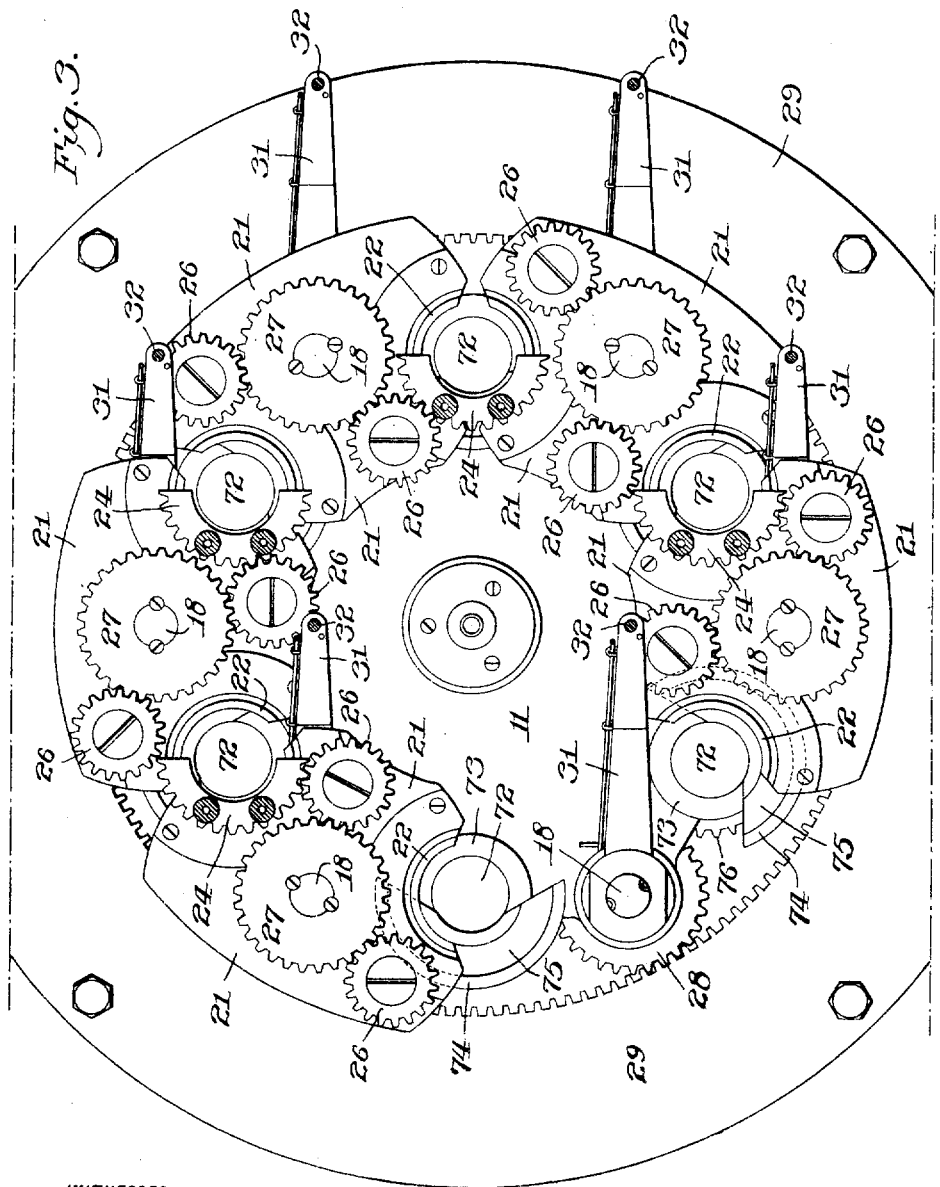
Figure 4:
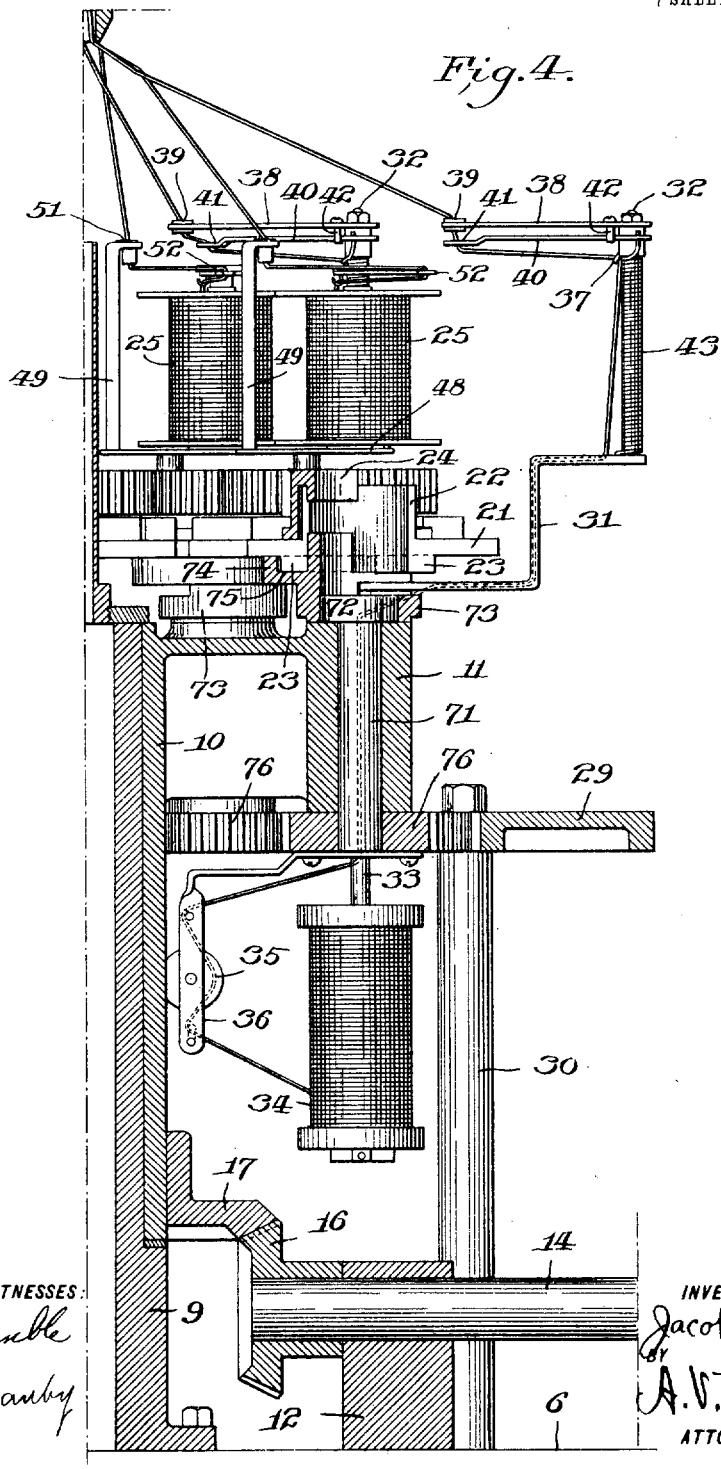
Figure 9:
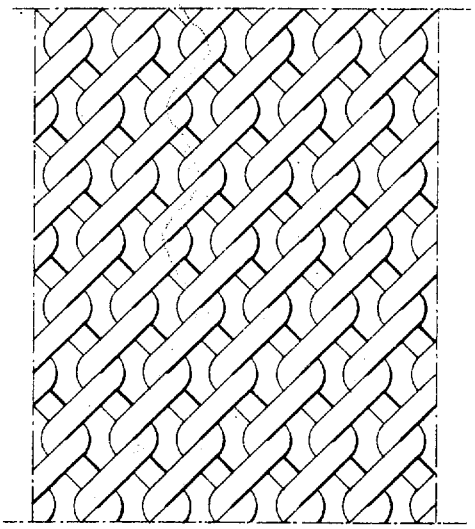
Figure 10:
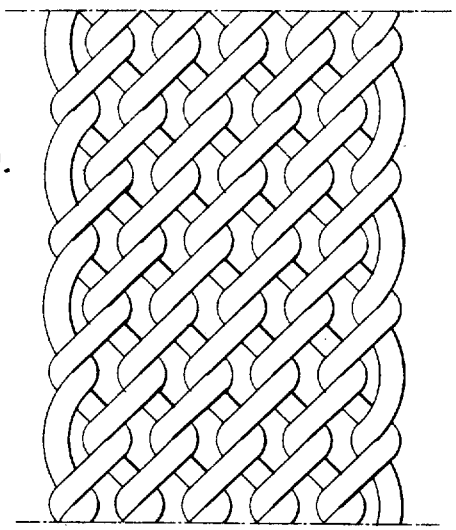

In the drawings—Figure 1 is an elevation of my improved machine. Fig. 2 is a sectional plan thereof, as seen from the line 2—2 of Fig. 1. Fig. 3 is a sectional plan, as seen from above the line 3—3 of Fig. 1. Fig. 4 is a sectional elevation, as on the line 4—4 of Fig. 2. Fig. 5 is a sectional elevation, as on the line 5—5 of Fig. 2, showing the thread-guiding arms moved parallel to the section line. Fig. 6 is an elevation of one of the bobbin carriers. Fig. 7 is a diagram showing the paths traversed by the free ends of the thread-guiding arms with respect to the upper bobbins, the bobbins being shown by dotted lines and the paths being shown by dot-and-dash lines. Fig. 8 is a plan view of several of the plates for supporting the bobbin carriers, showing their relative positions and also showing one of the segments connecting two of the plates together. Fig. 9 is an enlarged view showing development of the fabric produced by the machine. Fig. 10 is a similar view showing a development of the fabric that would be produced if one of the upper bobbins were removed from the machine.

The main frame of the machine comprises the bed plate 6 and the standards 7 and 8. Rising from the bed plate is a centrally arranged tubular post 9 to which is fitted the hub 10 of a frame 11 so as to be freely rotatable thereon. Journaled in bearings 12, 13 on the bed plate 6 is the driving shaft 14 which is provided on its outer end with a suitable driving pulley 15, and on its inner end with a bevel gear wheel 16 which meshes with a similar wheel 17 on the hub 10 by means of which the frame 11 is rotated.

Extending through the frame 11 and arranged at intervals around the hub 10 is a series of freely rotatable vertical shafts 18 each of which is provided with two collars 19 and 20 above the frame 11. The collars 20 support horizontally arranged plates 21 which extend toward each other and terminate before meeting each other thereby leaving open spaces between their adjacent ends. (See Fig. 8.) Formed in each pair of adjacent ends of the plates 21 are upper and lower circular flanges 22 and 23, respectively, which flanges are interrupted by the spaces between the plates 21. The upper flanges 22 form a set of trackways to which are fitted a set of semicircular carriers 24 overlapping the trackways and carrying a set of bobbins 25. The peripheries of the carriers 24 are provided with gear teeth, and the teeth of each carrier coact with the teeth of a pair of diametrically opposite pinions 26 by means of which the carriers 24 are driven around their respective trackways at a uniform rate of speed, the length of each carrier being such that its teeth are in engagement with one of the pinions 26 before being disengaged from the other. The pinions 26 are journaled on stud shafts on the plates 21, and are driven by gear wheels 27 on the upper ends of the shafts 18, the lower ends of which are provided with gear wheels 28 which mesh with and are actuated by a fixed gear ring 29 during the rotation of the frame, the gear ring 29 being supported on suitable posts 30 rising from the bed plate 6. Thus it will be seen that, when the frame 11 is rotated, the bobbin carriers 24 are not only bodily rotated around the machine but, at the same time, are independently rotated around their respective trackways.

Secured to each shaft 18 between the collars 19 and 20 is an angular thread guiding arm 31 the vertical portion of which clears the ends of the superposed plate 21 and passes through the spaces between said ends and the ends of the next adjacent plates 21 when the shaft 18 is rotated. The free end of each arm 31 is provided with a vertically extending pin 32 which, during the rotation of the arm 31 about its own axis, describes a circle around the two adjacent bobbins 25 under which the particular arm passes. It follows, therefore, that the paths traversed by the pins 32 of the respective arms 31 intersect each other, and that two adjacent bobbins 25 are not only inclosed by the path traversed by one pin 32 but are also separately inclosed by the paths traversed by the pins on the respective sides thereof, as indicated in Fig. 7.

The timing of the movement of the bobbin carriers 24 around their trackways with respect to the movement of the arms 31 is such that, when a particular arm 31 is passing a particular bobbin 25 the carrier 24 of the bobbin will pass over that portion of its trackway which is within the path traversed by the vertical portion of the arm, and that the same carrier, upon meeting the vertical portion of the next adjacent arm, will pass over that portion of its trackway which is within the path traversed by the vertical portion of said next adjacent arm. Thus it will be seen that each bobbin 25 is alternately supported within the two paths traversed by the two adjacent rotating arms 31 in order to permit the passage of the arms 31 between the bobbin carriers 24 and through spaces between the adjacent plates 21 which is one of the peculiar requirements of a machine of this character.

Depending from the lower ends of the shafts 18 are pins 33 on which are mounted a second set of bobbins 34. The threads from these bobbins pass, first, through suitable tension devices 35 mounted on arms 36 carried by the wheels 28 then up through vertical openings in the shafts 18 and out through horizontal openings in the collars 19 from which they are guided by suitable eyes along the edges of arms 31 and directed to eyes 37 projecting from the upper portions of the pins 32. The arms 38 project horizontally toward the axes of rotation of the arms 31 and are provided on their free ends with thread-guiding eyes 39; and rotatably mounted on the pins 32 directly beneath the arms 38 are arms 40 which are also provided on their free ends with thread-guiding eyes 41. The arms 40 are held normally against pins 42 projecting from the arms 38 by the action of springs 43 which encircle the pins 32 and are engaged at their respective ends with the arms 31 and 40. The threads from the bobbins 34 pass from the eyes 37 through the eyes 41 in the arms 40, then through the eyes 39 in the arms 38 from which they are directed to the braiding point 44 which, in the present instance, is the lower end of a centrally arranged tube 45 through which the product of the machine passes, and which is supported by an arm 46 projecting downwardly from a fixed shaft 47 which extends between the upper ends of the standards 7 and 8.

As the arms 31 are rotated around their own axes the thread-guiding eyes 39 move toward and from the center of the machine thereby increasing and decreasing the distance between said eyes and the braiding point 44. When the eyes 39 move toward the center of the machine, the free ends of the arms 40 swing away from the free ends of the arms 38 by the action of the springs 43 and thereby take up the slack thread; and when the eyes 39 move away from the center of the machine the free ends of the arms 40 are drawn toward their normal position against the action of the springs 43 for a succeeding operation. Thus it will be seen that the threads are always under tension, the arms 40 taking up the threads during the movement of the eyes 39 toward the center of the machine and feeding out the threads during movement of the eyes 39 away from the center of the machine.

The bobbin carriers 24 are provided with plates 48 which extend over the flanges or trackways 22 and support the bobbins 25 centrally thereof; to the end that, during the travel of the carriers 24, the bobbins 25 will be merely rotated about their own axes during their bodily rotation about the machine. Rising from the plate 48 are two pins 49 and 50 the upper ends of which are provided with thread guiding eyes 51 and horizontally extending arms 52, respectively. The arms 52 are rotatably mounted on the pins 50 and are provided on their free ends with thread-guiding eyes 53 which are adapted to swing toward and from a point directly beneath the eyes 51. The free ends of the arms 52 are held normally away from a position beneath the eyes 51 by the action of springs 54 encircling the pins 50 and engaging the plates 48 and arms 52, suitable stops 55 limiting the movement of the arms 52.

The threads from the bobbins 25 pass first through suitable tension devices 56 carried by the plates 48, then through eyes 57 near the pivot points of the arms 52 then to and up through the eyes 53 at the free ends of the arms 52 and finally up through the eyes 51 from which they are directed to the braiding point 44.

As the carriers 24 are rotated around their trackways, the thread guiding eyes 51 move toward and from the center of the machine, in consequence of which the distance between said eyes and the braiding point is increased and decreased. When the eyes 51 move toward the center of the machine, the free ends of the arms 52 swing away from the pins 49 by the action of the springs 54 and thereby take up the slack thread; and, when the eyes 51 move away from the center of the machine, the arms 52 are drawn toward their normal position against the action of the springs 54 for a succeeding operation, thereby maintaining the threads under tension at all times similarly to the operation of the arms 40 hereinbefore described.

The product of the machine passes up through the tube 45 and around a suitable take up wheel 58 which is mounted loosely on the shaft 47. The take up wheel 58 is actuated by a gear wheel 59 fixed to the side thereof and in mesh with a gear wheel 60 on a shaft 61 having its bearings in the standards 7 and 8. One end of the shaft 61 extends outwardly and is provided with a gear wheel 62 which meshes with a gear wheel 63 on one end of a short shaft 64 mounted in a suitable bearing 65. The other end of the shaft 64 is provided with a worm wheel 66 which is actuated by a worm 67 on the upper end of a vertical shaft 68. The lower end of the shaft 68 has affixed thereto a bevel gear wheel 69 which is driven by a similar wheel 70 on the main driving shaft 14, to the end that, when the main shaft 14 is actuated, the take up wheel 58 will be slowly rotated.

It will be observed that each plate 21 is supported at but one point and that the support is rotating about its own axis. Therefore, in order to maintain the plates in fixed relation to each other I provide the following:—Rotatably mounted in the frame 11 between the shafts 18 are shafts 71 corresponding in number with the flanges or track ways 22, the axes of rotation of the shafts 71 being coincident with the centers of the flanges 22 and 23. The upper ends of the shafts 71 are provided with heads 72 which take against the top of the frame 11; and secured to the heads 72 are collars 73 from the upper surfaces of which project segments 74. These segments are provided with grooves 75 which are fitted to the flanges 23 of the plates 21, to the end that, when the shafts 71 are rotated, the segments 74 will traverse the flanges 23. The shafts 71 are provided on their lower ends with gear wheels 76 which are driven by the gear wheels 28 on the shafts 18, whereby the segments 74 are independently rotated during their bodily rotation with the frame 11. The segments 74 extend part way around the flanges 23 and are so timed with respect to the movement of the arms 31 and carriers 24 as to permit the passage of the arms 31 between the plates, and to extend between and engage the adjacent ends of the plates 21 while the carriers 24 are engaged with but one plate. Thus it will be seen that the adjacent ends of the plates 21 are always connected by either the carrier 24 or the segments 74 thereby holding said plates rigidly together at all times.

It will be observed that the arms 38 carrying the thread-guiding eyes 39 extend toward the axes of rotation of the arms 31 thereby lessening the amount of take up which would be otherwise required for the threads from the bobbins 34.

By the above described construction it will be seen that the bobbins 25 and 34 are maintained in substantially fixed positions relatively to each other and that when power is applied to the driving pulley 15, the rotation of the wheel 58 will draw the threads through the eyes 39 and 51 from the bobbins 34 and 25 respectively and up through the tube 45. During this operation the threads from the bobbins 25 are being delivered direct to the braiding point, and each thread from the bobbins 34 is being guided by the arms 31 entirely around two adjacent bobbins 25, the two bobbins 25 that are inclosed by the path of one thread from the bobbins 34 being separately inclosed by the paths of the threads from the adjacent bobbins 34. Thus the threads from the two sets of bobbins 25 and 34 are braided together upon meeting the braiding point 44 to produce a cord, the development of which is shown in Fig. 9, excepting that the cord will be provided with a twist due to the bodily rotation of the bobbins with the frame 11.

It will be observed that by making the frame 11 a fixture and rotating the gear ring 29, the machine will produce a cord without the twist above referred to. It will also be observed that by omitting one of the bobbins, the machine will produce a flat woven fabric such as is illustrated in Fig. 10.

While I have herein shown and described my invention in a desirable and practical form yet I do not limit myself to this particular construction as the same may be greatly modified without departing from the invention.

I claim—

1. In a machine of the character described, the combination of a set of bobbin carriers, supporting means therefor having a space therebetween, a set of bobbins thereon delivering threads to the braiding point, a second set of bobbins, and means for passing the threads delivered from the second set of bobbins entirely around bobbins of the first named set and between the bobbins of said first named set, and through the spaces between the adjacent bobbin-supporting means.

2. In a machine of the character described, the combination of a set of bobbin-carriers, supporting means therefor having a space therebetween, a set of bobbins thereon delivering threads to the braiding point, a second set of bobbins, means for passing each thread delivered from the second set of bobbins entirely around two bobbins of the first named set, and between the bobbins of said first named set and through the spaces between the adjacent bobbin supporting means.

3. In a machine of the character described, the combination of a set of bobbin carriers, supporting means therefor having a space therebetween, a set of bobbins thereon delivering threads to the braiding point, a second set of bobbins, means for passing each thread delivered from the second set of bobbins entirely around two bobbins of the first named set and between the bobbins of the said first named set and through the spaces between the adjacent bobbin supporting means, the two bobbins that are inclosed by the path of one thread of the second set of bobbins being separately inclosed by the paths of two other threads of the second set of bobbins.

4. In a machine of the character described, the combination of a set of bobbin carriers, supporting means therefor having a space therebetween, a set of bobbins thereon delivering threads to the braiding point, a second set of bobbins, a series of thread guides for the threads delivered from the second set of bobbins, means for independently rotating said guides whereby the threads delivered from the second set of bobbins may be passed entirely around bobbins of the first named set and between the bobbins of said first named set and through the spaces between the adjacent bobbin-supporting means.

5. In a machine of the character described, the combination of means for supporting and rotating two sets of bobbins in the same direction and in annular paths around the braiding point, means for directing the threads delivered from one set of bobbins to the braiding point, a series of thread guides for the threads delivered from the other set of bobbins, and means for independently rotating said guides during the bodily rotation of the series, whereby the threads delivered from one set of bobbins may be passed entirely around the bobbins of the other set.

6. In a machine of the character described, the combination of means for supporting and rotating two sets of bobbins in the same direction and in annular paths around the braiding point, means for directing the threads delivered from one set of bobbins to the braiding point, a series of thread guides for the threads delivered from the other set of bobbins, means for independently rotating said guides during the bodily rotation of the series, whereby the threads delivered from one set of bobbins may be passed entirely around bobbins of the other set, and means for passing the threads of the thread guides between bobbins of the first named set and between the supports therefor.

7. In a machine of the character described, the combination of two sets of bobbins delivering threads to the braiding point, means for supporting said bobbins in substantially fixed positions relative to each other, and means for passing the threads delivered from one set of bobbins entirely around bobbins of the other set.

8. In a machine of the character described, the combination of two sets of bobbins delivering threads to the braiding point, means for supporting said bobbins in substantially fixed positions relative to each other, and means including a series of rotating thread guides for passing the threads delivered from one set of bobbins entirely around bobbins of the other set.

9. In a machine of the character described, the combination of two sets of bobbins delivering threads to the braiding point, means for supporting said bobbins in substantially fixed positions relatively to each other, means for independently rotating the threads delivered from one set of bobbins, and means for supporting each bobbin of the other set alternately within the paths traversed by the two adjacent rotating threads.

10. In a machine of the character described, the combination of two sets of bobbins delivering threads to the braiding point, means for independently rotating the threads delivered from one set of bobbins in intersecting paths and means for supporting each bobbin of the other set within the intersected portions of the paths traversed by two adjacent rotating threads.

11. In a machine of the character described, the combination of a series of two part trackways, supports therefor, rotatable carriers on said trackways, a set of bobbins on said carriers delivering threads to the braiding point, a second set of bobbins, means for passing the threads delivered from two bobbins of the second set of bobbins between the parts of one of said trackways and entirely around one of the first named bobbins, and means for actuating said carriers to permit the passage of the last named threads around said bobbins of the first named set.

12. In a machine of the character described, the combination of a series of two part trackways, supports therefor, rotatable carriers on said trackways, a set of bobbins on said carriers delivering threads to the braiding point, a second set of bobbins, a pair of rotating thread-guiding arms each of which is arranged to pass between the parts of one of said trackways and carry a thread delivered from the second set of bobbins entirely around one of the first named bobbins, means for supporting and rotating said arms, and means for actuating said carriers to permit the threads carried by said arms to pass entirely around bobbins of the first named set.

13. In a machine of the character described, the combination of a series of two part trackways, rotatable supports therefor, rotatable carriers on said trackways, a set of bobbins on said carriers delivering threads to the braiding point, a second set of bobbins, thread-guiding arms rotating with the supports, each arm passing between the parts of two adjacent trackways and carrying a thread delivered from the second set of bobbins, means for rotating said arms and supports, and means for actuating said carriers to permit the threads carried by said arms to pass entirely around bobbins of the first named set.

14. In a machine of the character described, the combination of a series of two-part trackways, rotatable supports therefor, a rotatable segment adapted to coact with the parts of each trackway to hold the latter in fixed relative position, rotatable carriers on said trackways, a set of bobbins on said carriers delivering threads to the braiding point, a second set of bobbins, thread-guiding arms rotating with the supports, each arm passing between the parts of two adjacent trackways and carrying a thread delivered from the second set of bobbins, means for rotating said arms and supports, means for actuating said carriers, and means for rotating said segments, whereby the threads carried by said arms may be passed entirely around bobbins of the first named set.

15. In a machine of the character described, the combination of two sets of bobbins delivering threads to the braiding point, a series of rotatable arms for guiding the threads delivered from one set of bobbins around bobbins of the other set, said arm extending outwardly to inclose a bobbin within its path of rotation and then inwardly toward its axis of rotation, and means for rotating said arms, substantially as and for the purpose set forth.

16. In a braiding machine of the kind described, two sets of strand supplies one comprising fliers and the other comprising carriers and tracks carrying said carriers, each track having a gap in its periphery for the passage of said fliers about said carriers, as described.

17. In a braiding machine of the kind described, two sets of strand supplies one comprising rotary fliers and the other comprising carriers, in combination with tracks, each track carrying a carrier capable of rotation about its periphery and having a gap in its periphery whereby a flier in its rotation may cross the path of said periphery and pass around the carrier carried by said track, as described.

18. In a braiding machine of the kind described, means for making an interlocking twist comprising two sets of strand supplies one comprising fliers and the other comprising carriers and tracks carrying said carriers, each track having a gap in its periphery for the passage of said fliers about said carriers, and means for giving a twist to the braided strands, as described.

19. In a braiding machine of the kind described, means for making an interlocking twist comprising two sets of strand supplies one comprising rotary fliers and the other comprising carriers, in combination with tracks, each track carrying a carrier capable of rotation about its periphery and having a gap in its periphery whereby a flier in its rotation may cross the path of said periphery and pass around the carrier carried by said track, and means for giving a twist to the braided strands, as set forth.

In testimony whereof I affix my signature in presence of two witnesses.

JACOB LUNDGREN.

Witnesses:
RALPH F. GAMBLE,
ANDREW V. GROUPE.